United States Patent Office

Re. 26,818
Reissued Mar. 10, 1970

26,818
N-PENICILLANOYLOXY DERIVATIVES

Kenneth David Hardy, Horsham, England, assignor to Beecham Group Limited, Brentford, England, a British company No Drawing. Original No. 3,347,851, dated Oct. 17, 1967, Ser. No. 562,129, July 1, 1966. Application for reissue May 1, 1968, Ser. No. 728,091

Int. Cl. C07d *99/22;* A61k *21/00*

U.S. Cl. 260—239.1 9 Claims

Matter enclosed in heavy brackets [ ] appears in the original patent but forms no part of this reissue specification; matter printed in italics indicates the additions made by reissue.

*ABSTRACT OF THE DISCLOSURE*

*N-penicillanoyloxy derivatives are provided having the formula:*

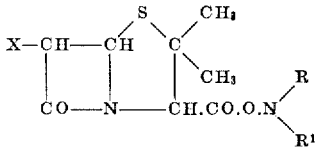

*wherein R is benzoyl and $R^1$ is phenyl, or R and $R^1$ together are alkylidene having 1 to 6 carbon atoms, α-(alkylcarbonyl)alkylidene having 1 to 6 carbon atoms in the alkyl moiety and 1 to 6 carbon atoms in the alkylidene moiety, cycloalkylidene having 3 to 6 carbon atoms, aralkylidene of the formula:*

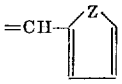

*wherein Z is O, S or N, benzylidene, succinyl or phthaloyl; and X is:*

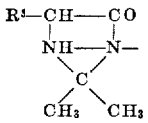

*wherein $R^5$ is phenyl or 2-thienyl;*

*or X is Y.CO.NH—, wherein Y is benzyl; a 2,6-di(lower-alkoxy)-phenyl group in which each lower alkoxy group is methoxy or ethoxy; a 2-alkoxy-1-naphthyl group in which the alkoxy group has 1 to 4 carbon atoms; a 3,5-disubstituted-4-isoxazolyl group of the formula:*

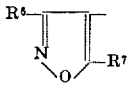

*wherein one of $R^6$ and $R^7$ is a lower alkyl group of 1 to 4 carbon atoms and the other is*

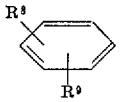

*wherein $R^8$ and $R^9$ are each hydrogen, chlorine or fluorine; an α-(phenoxy)alkyl group wherein the alkyl group has 1 to 4 carbon atoms; 3-thenyl; 2-thenyl; furfuryl; α-sulphamoyl-benzyl; a group of the formula:*

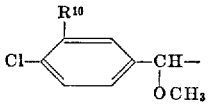

*where $R^{10}$ is hydrogen or chlorine; α-aminobenzyl; or a group of the formula:*

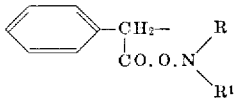

*wherein $NRR^1$ is as defined above.*

This invention relates to penicillin derivatives and is particularly concerned with a novel class of N-pencillanoyloxy derivatives.

Many penicillin derivatives are known in which the carboxyl group of the penicillanic acid moiety has been converted to an ester, amide, etc., but such structural modification usually results in a reduction of biological activity against most strains of bacteria.

We have found that the N-penicillanoyloxy derivatives of the present invention have the same order of activity against a wide range of bacteria as the parent penicillins from which they were derived.

We have further found that the physical properties of the compounds of the present invention are quite different from those of the usual penicillins and pencillin salts, especially in that their solubility in organic solvents, oils and fats is much greater whereas their solubility in water is much less. Accordingly, the new compounds may be employed in depot therapy (for example by intramuscular injection in admixture or conjunction with pharmaceutically acceptable vehicle), thereby achieving sustained release of antibiotic into the bloodstream over a prolonged period following a single dose.

A further consequence of the increased fat solubility of the new compounds is that certain of them show an enhanced ability to pass through fatty membranes within the animal body. In some cases this results in improved absorption from the gastrointestinal tract into the bloodstream. Again, some of the new derivatives enter and remain within the cerebrospinal fluid more readily than do the conventional penicillin salts.

According to the present invention there are provided penicillanic acid derivatives of the [general] formula:

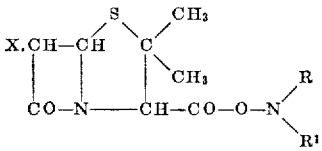

(I)

wherein R is an acyl group *such as benzoyl* and $R^1$ is an aryl group *such as phenyl,* or R and $R^1$ together *are* [represent] an alkylidene, α-acylalkylidene, cycloalkylidene (e.g., cyclohexylidene), aralkylidene (e.g., benzylidene, substituted benzylidene, or furfurylidene), succinyl $$(—COCH_2CH_2CO—)$$

phthaloyl or substituted phthaloyl radical, and X is an acylamino group or a derivative thereof.

The group X may comprise any side chain which gives an active penicillin. Thus the hydrocarbon portion of X may be an aliphatic, arylaliphatic, aromatic or heterocyclic group any of which may be substituted. In the case in which the group X is an α-aminoacetamide derivative the two amine functions may be condensed with an aldehyde or ketone to form a cyclic structure of the type:

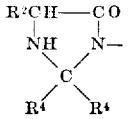

where $R^2$ is a carbocyclic or heterocyclic aromatic group (especially phenyl, substituted phenyl, or thienyl), $R^3$ is a hydrogen atom or a methyl group, $R^4$ is a lower alkyl group or $R^3$ and $R^4$ together represent a tetramethylene or pentamethylene radical.

The present invention further provides a process for the preparation of penicillanic acid derivatives having the [general] Formula I in which a reactive derivative of an acid of the [general] formula:

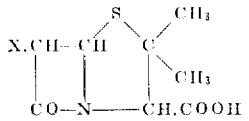

(II)

is treated with an N,N-disubstituted hydroxylamine of the [general] formula:

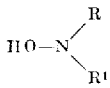

(III)

where X, R and $R^1$ are as hereinbefore defined.

The hydroxylamine may be an oxime, such as acetone oxime or benzaldoxime, a N-hydroxyimide, such as N-hydroxyphthalimide or N-hydroxysuccinimide, or a N-hydroxy-N-arylamide.

The reactive derivative of the acid (II) may be the acid chloride, anhydride, mixed anhydride, or the reactive intermediate formed from the acid and a carbodiimide or carbonyldiimidazole.

The following examples illustrate the invention:

EXAMPLE 1

N(6-phenylacetamido penicillanoyloxy)isopropylidene imine

Potassium benzylpenicillin (3.72 g. 0.01 mol) suspended in dry acetone (30 ml.) was cooled to −5° C. with stirring and treated with ethyl chloroformate (0.96 ml.) followed by dry pyridine (1 drop). The temperature was maintained at −5° C., with stirring, for ½ hour. A solution of acetoxime (1.46 g. 0.02 mol) in dry acetone (5 ml.) was added all at once and stirring continued for 2 hours, without further cooling. The mixture was filtered through Celite brand kieselguhr and the filtrate was evaporated to dryness under reduced temperature and pressure. The residue was dissolved in ethyl acetate (30 ml.) and washed successively with water (10 ml.), N sodium bicarbonate (10 ml.) and water (10 ml.). The organic layer was dried over anhydrous magnesium sulphate and then evaporated under reduced temperature and pressure to give the product as a stiff gum 3.57 g. (91.8%).

EXAMPLE 2

N[6-(2,2-dimethyl-5-oxo-4-phenyl-1-imidazolidinyl) penicillanoyloxy]isopropylidene imine 6-(2,2-dimethyl-5-oxo - 4 - phenyl - 1 - imidazolidinyl) penicillanic acid was prepared by stirring a suspension of 6 - [D(-)α-aminophenylacetamido]penicillanic acid trihydrate in an excess of acetone containing two equivalents of triethylamine for 5 hours, at 40–45° C., followed by cooling, dilution with water, and acidification.

This 6 - (2,2-dimethyl-5-oxo-4-phenyl-1-imidazolidinyl) penicillanic acid (19.90 g. 0.05 mol) was mixed with methylene chloride (150 ml.) and triethylamine (7.0 ml.), cooled to −5° C. and treated with ethyl chloroformate (4.8 ml.). The temperature was maintained at −5° C., with stirring, for ½ hour. A solution of acetoxime (4.5 g.) in dry acetone (25 ml.) was added all at once and the stirring continued, without further cooling, for 2 hours. The mixture was filtered through Celite and the filtrate washed successively with water (50 ml.), N sodium bicarbonate (50 ml.), and water (50 ml.). The organic layer was dried over anhydrous magnesium sulphate and then evaporated to dryness under reduced temperature and pressure. The residue was dissolved in ethyl acetate (30 ml.) and diluted with dry ether (150 ml.) to give a clear solution. Water (2 ml.) was added to the solution, which was then stirred thoroughly whereupon crystallization occurred. After the mixture had stood for one hour, the product was filtered off, washed with ether, and dried in air to give 20 g. (88.5%) of a colorless crystalline solid M.P. 93–94° C. (d). (Found: C, 55.39; H, 7.06; N, 11.67; S, 6.43. $C_{22}H_{28}O_4N_4S.2H_2O$ requires C, 54.97; H, 6.71; N, 11.66; S, 6.67%.)

EXAMPLE 3

N[6-(α-sulphamoyl phenylacetamido)-penicillanoyloxy]isopropylidene imine

Sodium α-sulphamoylbenzylpenicillin (2.18 g. 0.005 mol.) suspended in dry acetone (20 ml.) was cooled to −5° C. and treated with ethyl chloroformate (0.48 ml.) and dry pyridine (1 drop). The temperature was maintained at −5° C., with stirring, for ½ hour. Acetoxime (0.73 g. 0.01 mol.) in dry acetone (5 ml.) was added all at once and stirred for 2 hours without further cooling. The product was isolated as in Example 1. The residual gum, after evaporation of the solvent, was triturated with dry ether to give the product 0.52 g. (21.4%) as a colorless noncrystalline solid.

EXAMPLE 4

N(6-phenylacetamido penicillanoyloxy)benzylidene imine

Potassium benzylpenicillin (3.72 g., 0.01 mol.) suspended in dry acetone (30 ml.) was cooled to −5° C. and treated with ethyl chloroformate (0.96 ml.) and dry pyridine (1 drop). The temperature was maintained, with stirring, at −5° C. for ½ hour. α-Benzaldoxime (1.2 g., 0.01 mol.) dissolved in dry acetone (7 ml.) was added all at once and stirring was continued, without further cooling, for 2 hours. The product was isolated as in Example 1 as a concentrated solution in ethyl acetate. Dilution with dry ether gave a clear solution which crystallized on standing and scratching. The solid was filtered off, washed with dry ether and dried in vacuo to give 1.93 g. (44.1%) of a colorless crystalline solid M.P. 140–142° C. (Found: C, 62.86; H, 5.66; N, 9.28; S, 7.19. $C_{23}H_{23}O_4N_3S$ requires C, 63.13; H, 5.30; N, 9.61; S, 7.33%.)

EXAMPLE 5

N(6-phenylacetamido penicillanoyloxy) cyclohexylidene imine

The mixed anhydride from benzylpenicillin and ethyl chloroformate prepared as in Example 4 was treated all at once with a solution of cyclohexanoneoxime (1.1 g. 0.01 mol.) in dry acetone (5 ml.) and stirred for 2 hours without further cooling. The product was isolated as in Example 1 to give a stiff gum 3.8 g. (88.6%).

EXAMPLE 6

N[6-(2,2-dimethyl-5-oxo-4-phenyl-1-imidazolidinyl) penicillanoyloxy]benzylidene imine The mixed anhydride (0.01 mol.) was prepared from 6 - (2,2 - dimethyl-5-oxo-4-phenyl-1-imidazolidinyl)penicillanic acid and ethyl chloroformate as described in Example 2. This was treated all at once with a solution of α-benzaldoxime (1.2 g., 0.01 mol.) in dry acetone (5 ml.) and stirred without further cooling for 2 hours. The product was isolated as in Example 1 to give a gum which on trituration with di-isopropyl ether gave 3.19 g. (64.8%) of a colorless noncrystalline solid.

EXAMPLE 7

N[6-{α-(benzylidene imino oxycarbonyl)phenyl acetamido}penicillanoyloxy]benzylidene imine Disodium α-carboxybenzylpenicillin (4.22 g., 0.01 mol) suspended in dry acetone (30 ml.) was cooled to −5° C., treated with ethyl chloroformate (1.92 ml.) and dry pyridine (2 drops) and stirred at −5° C. for ½ hour. A solution of [α-benzalodoxime] *α-benzaldoxime* (2.4 g. 0.02 mol) in dry acetone (10 ml.) was added all at once and stirring was continued without further cooling for 2 hours. The product was isolated as in Example 1 to give a hard glass which was ground to a white powder, 1.4 g. (23.4%).

EXAMPLE 8

N(6-phenylacetamido penicillanoyloxy)phthalimide

The mixed anhydride was prepared as in Example 4 from potassium benzylpenicillin and ethylchloroformate and was treated all at once with a solution of N-hydroxyphthalimide (1.63 g. 0.01 mol.) dissolved in warm dry dioxan (10 ml.) and stirred for 2 hours without further cooling. The product was isolated as in Example 1 as a concentrated solution in ethyl acetate. Dilution with dry ether (10 vols.) gave a clear solution which crystallized on standing and scratching. The solid was filtered off, washed with dry ether and dried in vacuo to give 1.83 g. (38.2%) of a colorless crystalline solid M.P. 179–191° C. (d.). Recrystallization from acetone-ether raised the melting point to 185–187° C. (d.). (Found: C, 60.5; H, 4.64; N, 8.87; S, 6.44. $C_{24}H_{21}O_6N_3S$ requires C, 60.1; H, 4.42; N, 8.77; S, 6.69%.)

EXAMPLE 9

N[6-(2,2-dimethyl-5-oxo-4-phenyl-1-imidazolidinyl) penicillanoyloxy]phthalimide

The mixed anhydride (0.01 mol.) as prepared in Example 2 was treated all at once with a solution of N-hydroxyphthalimide (1.63 g. 0.01 mol.) dissolved in warm dry dioxan (10 ml.) and stirred without further cooling for 2 hours. The product was isolated as in Example 2 to give a non-crystalline solid on dilution with dry ether 2.13 g. (39.8%).

EXAMPLE 10

N(6-phenylacetamido penicillanoyloxy)succinimide

The mixed anhydride (0.01 mol.) as prepared in Example 4 was treated all at once with a solution of N-hydroxysuccinimide (1.15 g. 0.01 mol.) in dry acetone (7 ml.) and stirred for 2 hours without further cooling. The product was isolated as in Example 1 as a thick yellow oil 2.7 g. (62.6%).

EXAMPLE 11

N(6-phenylacetamido penicillanoyloxy) N-phenylbenzamide

The mixed anhydride (0.01 mol.) as prepared in Example 4 was treated, all at once, with N-benzoyl-N-phenylhydroxylamine (2.13 g. 0.01 mol.) in dry dioxan (10 ml.) and stirred for 2 hours without further cooling. The product was isolated as in Example 1 as a brown viscous oil 2.1 g. (39.7%).

EXAMPLE 12

N(6-phenylacetamido penicillanoyloxy)furfurylidene imine

The mixed anhydride (0.01 mol.) as prepared in Example 4 was treated, all at once with a solution of α-furfuradoxime (1.1 g. 0.01 mol) in dry acetone (5 ml.) and stirred for 2 hours without further cooling. The product was isolated as in Example 1 as a concentrated solution in ethyl acetate. Dilution with dry ether (5 vols.) gave a clear solution which crystallized on addition of a trace of water. The solid was filtered off, washed with dry ether and dried in vacuo to give 2.28 g. (53.4%) of a colorless crystalline solid. M.P. 124–126° C. Recrystallization from acetone/dry ether gave material M.P. 126–128° C. (Found: C, 59.52; H, 4.89; N, 9.84; S, 7.60. $C_{21}H_{21}O_5N_3S$ requires: C, 59.0; H, 4.95; N, 9.83; S, 7.50.)

EXAMPLE 13

N[6-(2,6-dimethoxybenzamido)penicillanoyloxy] isopropylidene imine

Sodium 2,6-dimethoxyphenylpenicillin (4.02 g. 0.01 mol.) was converted to the mixed anhydride as in Example 4 and treated all at once with a solution of acetoxime (0.73 g. 0.01 mol.) in dry acetone (5 ml.). The product was isolated as in Example 1 to give a hard glass which was ground to a pale yellow powder 3.9 g. (89.7%).

EXAMPLE 14

N{6-[3-(o-chlorophenyl)5-methyl isoxazole-4-carbonamido}penicillanoyloxy]isopropylidene imine Sodium 3-(o-chlorophenyl)-5-methyl-4-isoxazolyl penicillin (4.47 g. 0.01 mol) was converted to the mixed anhydride as in Example 4 and treated all at once with a solution of acetoxime (0.73 g. 0.01 mol.) in dry acetone (5 ml.). The reaction mixture was stirred without further cooling for 2 hours. The product was worked up as in Example 1 to give a hard glass which was ground to give a yellow powder 3.25 g. (66.3%).

EXAMPLE 15

N[6-(α-phenoxypropionamido)penicillanoyloxy] isopropylidene imine

Sodium α-phenoxyethylpenicillin (15.44 g. 0.04 mol.) was converted to the mixed anhydride as in Example 4 and treated all at once with a solution of acetone (2.92 g. 0.04 mol.) in dry acetone (20 ml.). The reaction mixture was stirred without further cooling for 2 hours. The product was worked up as in Example 1 to give a pale yellow oil. Trituration of the oil with dry ether caused crystallization to occur. The solid product was filtered off, washed with dry ether and dried in vacuo to give 8.5 g. (50.7%) of a colorless crystalline solid M.P. 115–117° C. (Found: C, 56.98; H, 6.10; N, 9.56; S, 7.56. $C_{20}H_{25}O_5N_3S$ requires: C, 57.26; H, 6.01; N, 10.02; S, 7.64.).

EXAMPLE 16

N(6-phenoxyacetamido penicillanoyloxy) isopropylidene imine

Potassium phenoxymethyl penicillin (15.52 g. 0.04 mol.) was converted to the mixed anhydride as in Example 4 and treated all at once with a solution of acetoxime (2.92 g. 0.04 mol.) in dry acetone (20 ml.). The reaction mixture was stirred, without further cooling, for 2 hours. The product was worked up as in Example 1 when the concentrated ethyl acetate solution crystallised. The solid was filtered off, washed with ethyl acetate and dried in vacuo to give 13.2 g. (81.5%) of a colorless crystalline solid M.P. 142–144° C.

EXAMPLE 17

N(6-phenoxyacetamido penicillanoyloxy)benzylidene imine

The mixed anhydride (0.04 mol.) prepared as in Example 16 was treated all at once with a solution of α-benzaldoxime (4.8 g. 0.04 mol.) in dry acetone (20 ml.) and stirred without further cooling for 2 hours. The product was isolated as in Example 1 to give a viscous yellow oil. Trituration of the oil with light petroleum gave a non-crystalline solid 11.4 g. (62.9%).

EXAMPLE 18

N[6-(α-phenoxyproponamido)penicillanoyloxy] benzylidene imine

The mixed anhydride (0.04 mol.) as prepared in Example 15 was treated all at once with a solution of α-benzaldoxime (4.8 g. 0.04 mol.) in dry acetone (20 ml.) and stirred without further cooling for 2 hours. The product, isolated as in Example 1, was obtained as a viscous pale yellow oil. Trituration of the oil with light petroleum gave a white noncrystalline solid 10.7 g. (57.3%).

EXAMPLE 19

N(6-phenylacetamido pencillanoyloxy)α-acetylethylidene imine

The mixed anhydride (0.02 mol.) as prepared in Example 4 was treated all at once with a solution of diacetyl monoxime (2.02 g. 0.02 mol.) in dry acetone (10 ml.) and stirred without further cooling for 2 hours. The product was isolated as in Example 1 to give a brown viscous oil 6.05 g. (72.6%).

EXAMPLE 20

N(6-α-furylacetamido penicillanoyloxy)furfurylidene imine

This was prepared as described in Example 12 except that the mixed anhydride used was prepared from sodium α-furylmethylpenicillin instead of from potassium benzyl penicillin.

EXAMPLE 21

N[6-α-(benzylideneimino oxycarbonyl)3-thienylacetamido penicillanoyloxy]benzylidene imine This was prepared as described in Example 7 but starting with disodium α-carboxy-3-thienylmethylpenicillin instead of disodium α-carboxybenzylpenicillin.

I claim:

1. N-[6-(2,2-dimethyl - 5 - oxo-4-phenyl-1-imidazolidinyl)penicillanoyloxy]isopropylidene-imine.

2. N-(6 - phenylacetamido - pencillanoyloxy)benzylidene-imine.

3. N-(6 - phenylacetamido - penicillanoyloxy)phthalimide.

4. N-(6 - phenylacetamido - penicillanoyloxy)furfurylidene-imine.

5. N-[6-(2,6 - dimethoxybenzamido)penicillanoyloxy] isopropylidene-imine.

6. N-[6-(α - phenoxypropionamido)penicillanoyloxy] isopropylidene-imine.

7. [An injectable] *A* compound [suitable for depot therapy] having the formula:

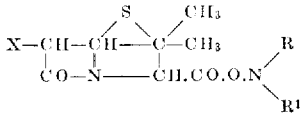

wherein R is benzoyl and $R^1$ is phenyl, or R and $R^1$ together are alkylidene having 1 to 6 carbon atoms, α-(alkylcarbonyl)alkylidene having 1 to 6 carbon atoms in the alkyl moiety and 1 to 6 carbon atoms in the alkylidene moiety, cycloalkylidene having 3 to 6 carbon atoms, aralkylidene of the formula:

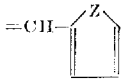

wherein Z is O, S or N, *benzylidene*, succinyl or phthaloyl; and X is:

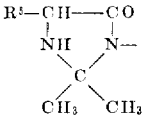

wherein $R^5$ is phenyl or 2-thienyl;

or X is Y.CO.NH—, wherein Y is benzyl; a 2,6-di(lower-alkoxy)-phenyl group in which each lower alkoxy group is methoxy or ethoxy; a 2-alkoxy-1-naphthyl group in which the alkoxy group has 1 to 4 carbon atoms; a 3,5-disubstituted-4-isoxazolyl group of the formula:

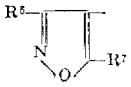

wherein one of $R^6$ and $R^7$ is a lower alkyl group of 1 to 4 carbon atoms and the other is

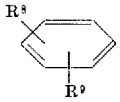

wherein $R^8$ and $R^9$ are each hydrogen, chlorine or fluorine; an α-(phenoxy)alkyl group wherein the alkyl group has 1 to 4 carbon atoms; 3-thenyl; 2-thenyl; furfuryl; α-sulphamoylbenzyl; a group of the formula:

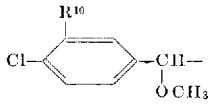

where $R^{10}$ is hydrogen or chlorine; α-aminobenzyl; or a group of the formula:

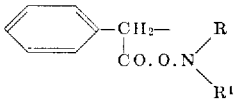

wherein $NRR^1$ is [the same] as [the other —$NRR^1$ group] defined above.

8. [An injectable] *A* compound [suitable for depot therapy] having the formula:

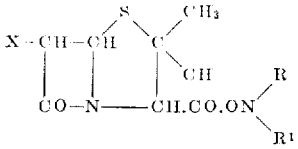

wherein R is benzoyl and $R^1$ is phenyl, or R and $R^1$ together are alkylidene having 1 to 6 carbon atoms, α-(alkylcarbonyl)alkylidene having 1 to 6 carbon atoms in the alkyl moiety and 1 to 6 carbon atoms in the alkylidene moiety, cycloalkylidene having 3 to 6 carbon atoms, aralkylidene of the formula:

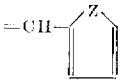

wherein Z is O, S or N, *benzylidene*, succinyl or phthaloyl; and X is

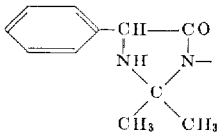

or Y.CO.NH—, wherein Y is benzyl, 2,6-dimethoxyphenyl; a 3-(substituted phenyl)-5-methyl-4-isoxazolyl group of the formula:

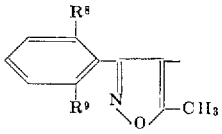

wherein $R^8$ and $R^9$ are each hydrogen, chlorine or fluorine; α-(phenoxy)-alkyl wherein the alkyl has 1 to 3 carbon atoms; furfuryl; 3-thenyl; α-sulphamoyl-benzyl; or a group of the formula:

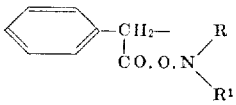

wherein $NRR^1$ is [the same] as [the other $NRR^1$ group] defined above.

9. [An injectable] *A* compound [suitable for depot therapy] having the formula:

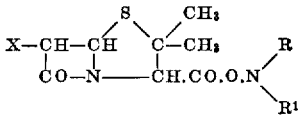

wherein R is benzoyl and $R^1$ is phenyl or R and $R^1$ together are isopropylidene, benzylidene, cyclohexylidene, α-acetylethylidene, furfurylidene, succinyl, or phthaloyl and X is:

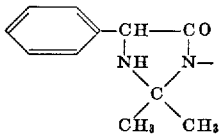

or Y.CO.NH—, wherein Y is benzyl; 2,6-dimethoxyphenyl; 3-o-chlorophenyl-5-methyl-4-isoxazolyl; phenoxymethyl; α-phenoxyethyl; α-sulphamoylbenzyl; 3-thenyl; furfuryl; or

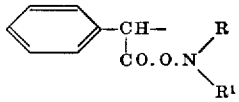

wherein $NRR^1$ is [the same] as [the other $NRR^1$ group] defined above.

References Cited

The following references, cited by the Examiner, are of record in the patented file of this patent or the original patent.

UNITED STATES PATENTS 3,250,679 5/1966 Jansen et al. _____ 260—239.1

NICHOLAS S. RIZZO, Primary Examiner

U.S. Cl. X.R.

424—271